(12) United States Patent
Basu et al.

(10) Patent No.: US 6,270,642 B1
(45) Date of Patent: Aug. 7, 2001

(54) FABRICATION OF ZIRCONIA ELECTROLYTE FILMS BY ELECTROPHORETIC DEPOSITION

(75) Inventors: Rajendra N. Basu; Merrilea J. Mayo; Clive A. Randall, all of State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/408,617

(22) Filed: Sep. 30, 1999

(51) Int. Cl.$^7$ ..................................................... C25D 13/00
(52) U.S. Cl. ......................... 204/487; 204/490; 204/491
(58) Field of Search .................................. 204/490, 491, 204/487

(56) References Cited

U.S. PATENT DOCUMENTS

| | | | |
|---|---|---|---|
| H1682 | * 10/1997 | Brown et al. | 205/509 |
| 5,002,647 | * 3/1991 | Tanabe et al. | 204/490 |
| 5,468,358 | * 11/1995 | Ohkawa et al. | 204/491 |
| 5,472,583 | * 12/1995 | Kerkar | 204/491 |
| 5,516,596 | * 5/1996 | Camilletti et al. | 428/698 |

OTHER PUBLICATIONS

Nguyen Quang Minh et al.: *Science and Technology of Ceramic Fuel Cells*, 1–14, Elsevier, New York, 1995. No Month Available.

S.C. Singhal: Recent Progress in Tubular Solid Oxide Fuel Cell Technology, Proceedings of the Fifth International Symposium on Solid Oxide Fuel Cells, 37–50, Electrochemical Soc. Inc., 1997. No Month Available.

Nguyen Quang Minh: Ceramic Fuel Cells, *J. Am. Ceram. Soc.*, 76 [3] 563–88, 1993. No Month Available.

S.P.S. Badwal et al: Solid Oxide Electrolyte Fuel Cell Review, *Ceramics International*, 22, 257–265, 1996.

S.P.S. Badwal et al.: Materials For Solid Oxide Fuel Cells, *Materials Forum*, 21, 187–224, 1997.

B.C.H. Steele: Materials For Electrochemical Energy Conversion and Storage Systems, *Ceramics International*, 19, 269–277, 1993.

N.J. Maskalick: Design and Performance of Tubular Solid Oxide Fuel Cells, Proceedings of the First International Symposium on Solid Oxide Fuel Cells, 279–287, Electrochemical Soc. Inc., 1989.

Nguyen Q. Minh et al.: Forming and Processing of Monolithic Solid Oxide Fuel Cells, Proceedings of the First International Symposium on Solid Oxide Fuel Cells, 307–316, Electrochemical Soc. Inc., 1989.

P.A. Lessing et al.: Fabrication Technologies For a Planar Solid Oxide Fuel Cell, Proceedings of the First International Symposium on Solid Oxide Fuel Cells, 337–360, Electrochemical Soc. Inc., 1989.

Diane Traub Hooie: Status of SOFC Development in U.S.A., Proceedings of the Third International Symposium on Solid Oxide Fuel Cells, 3–5, Electrochemical Soc. Inc., 1993.

Hiroaki Tagawa: Status of SOFC Development in Japan, Proceedings of the Third International Symposium on Solid Oxide Fuel Cells, 7–15, Electrochemical Soc. Inc., 1993.

(List continued on next page.)

*Primary Examiner*—Kishor Mayekar
(74) *Attorney, Agent, or Firm*—Pauley Peterson Kinne & Fejer

(57) ABSTRACT

A method for deposition of an electrolyte material on a porous substrate in which a suspension of particles having a controlled surface charge and suitable for use as an electrolyte is formed and the porous substrate, which is made of an electrode material is immersed. A voltage is applied across the suspension between an electrode in contact with the suspension and the porous substrate, whereby at least a portion of the particles migrate toward the porous substrate and are deposited on the porous substrate.

13 Claims, 14 Drawing Sheets

OTHER PUBLICATIONS

P. Zegers.: Status of SOFC Development in Europe, Proceedings of the Third International Symposium on Solid Oxide Fuel Cells, 17–20, Electrochemical Soc. Inc., 1993.

S.P.S. Badwal et al.: Status of SOFC Development in Australia, Proceedings of the Third International Symposium on Solid Oxide Fuel Cells, 21–27, Electrochemical Soc. Inc., 1993.

S.C. Singhal: Advances in Tubular Solid Oxide Fuel Cell Technology, Proceedings of the Fourth International Symposium on Solid Oxide Fuel Cells, 195–207, Electrochemical Soc. Inc., 1995.

Michael Hsu et al.: ZTEK Advanced Planar Solid Oxide Fuel Cell for Distributed Generation, *1998 Fuel Cell Seminar Abstracts*, 17–20, Nov. 16–19, 1998.

S.C. Singhal et al.: Advances in Solid Oxide Fuel Cell Technology, *1998 Fuel Cell Seminar Abstracts*, 266–269, Nov. 16–19, 1998.

Masanobu Aizawa et al.: Recent Advances in Tubular Type SOFC Development by Wet Process, *1998 Fuel Cell Seminar Abstracts*, 270–273, Nov. 16–19, 1998.

S. Kakigami et al.: Development of SOFC Module, Proceedings of the Fifth International Symposium on Solid Oxide Fuel Cells, 180–186, Electrochemical Soc. Inc., 1997.

T. Ogiwara et al.: Development of Planar SOFC Stacks With Direct Internal Reforming, *1998 Fuel Cell Seminar Abstracts*, 254–257, Nov. 16–19, 1998.

J. Yamanis et al.: Performance of Radial Thin–Electrolyte Solid Oxide Fuel Cells, *1998 Fuel Cell Seminar Abstracts*, 258–261, Nov. 16–19, 1998.

Nguyen Minh et al.: High–Performance, Reduce–Temperature Solid Oxide Fuel Cell Technology, *1998 Fuel Cell Seminar Abstracts*, 262–265, Nov. 16–19, 1998.

Nagao Hisatome et al.: Development of Tubular Type SOFC, *1998 Fuel Cell Seminar Abstracts*, 28–31, Nov. 16–19, 1998.

G. Schiller et al.: Development of Plasma Sprayed Components for a New SOFC Design, Proceedings of the Fifth International Symposium on Solid Oxide Fuel Cells, 635–644, Electrochemical Soc. Inc., 1997.

G. Schiller et al.: Development of SOFC Components by Vacuum Plasma Spraying, *1998 Fuel Cell Seminar Abstracts*, 515–518, Nov. 16–19, 1998.

Scott L. Swartz et al.: Colloidal Fabrication Process for Thin–Film Solid Oxide Electrolyte Membranes, *1998 Fuel Cell Seminar Abstracts*, 72–75, Nov. 16–19, 1998.

Partho Sarkar et al.: Electrophoretic Deposition (EPD): Mechanisms, Kinetics, and Application to Ceramics, *J. Am. Ceram. Soc.*, 79 [8] 1987–2002, 1996.

L. Vandeperre et al.: Electrophoretic Forming of Laminated Ceramic Composite Tubes, *Key Engineering Materials*, vols. 132–136, 2013–2016, 1997.

N. Koura et al.: Preparation of the Superconducting Oxides Magnetic Shielding by Using the Electrophoretic Deposition Method, *J. Ceram. Soc. of Japan, Int. Edition*, vol. 104, 810–814, 1996.

Tatsumi Ishihara et al.: Electrophoretic Deposition of Stabilized Zirconia for Solid Oxide Fuel Cells, Proceedings of the Third International Symposium on Solid Oxide Fuel Cells, 65–73, Electrochemical Soc. Inc., 1993.

Tatsumi Ishihara et al.: Electrophoretic Deposition of $Y_2O_3$–Stabilized $ZrO_2$ on the Porous $La_{0.8}Sr_{0.2}MnO_3$ Cathode Substrate for SOFC, Proceedings of the Fourth International Symposium on Solid Oxide Fuel Cells, 334–343, Electrochemical Soc. Inc., 1995.

Tatsumi Ishihara et al.: Electrophoretic Deposition of $Y_2O_3$–Stabilized $ZrO_2$ Electrolyte Films in Solid Oxide Fuel Cells, *J. Am. Ceram. Soc.*, 79 [4] 913–919, 1996.

* cited by examiner

FABRICATION OF ZIRCONIA ELECTROLYTE FILMS BY ELECTROPHORETIC DEPOSITION

BACKGROUND OF THE INVENTION

1. Field of the Invention

This invention relates to a method and apparatus for deposition of solid electrolyte materials on porous substrates suitable for use as electrodes in fuel cells. More particularly, this invention relates to a method and apparatus for fabrication of electrolyte films by electrophoretic deposition (EPD) on porous substrates suitable for use as electrodes in high temperature solid oxide fuel cells.

2. Description of Prior Art

In recent years, noteworthy technological advancements have been made to expedite the commercialization of high temperature solid oxide fuel cells (SOFCs)—a non-conventional device for producing electrical energy from fossil fuels. Globally, the potential of fuel cell technology has been well-recognized, mainly due to its unprecedented high electrical power efficiency, reliability, modularity, fuel adaptability, environmentally friendly end-products (very low levels of $NO_x$ and $SO_x$ emissions) and noise-free operation during electricity production. See N. Q. Minh and T. Takahashi, *Science and Technology of Ceramic Fuel Cells*, Elsevier, N.Y., 1995; S. C. Singhal, *Proceedings of the Fifth International Symposiums on Solid Oxide Fuel Cells*, Eds. U. Stimming et al. Electrochemical Soc., Pennington, p. 37, 1997; N. Q. Minh, *J. Am. Ceram. Soc.*, 76 (1993) 563; S. P. S. Badwal et al, *Ceramic International*, 22 (1996) 257 and *Materials Forum*, 21 (1997) 187; and B. C. H. Steele, *Ceramic International*, 19 (1993) 269. Among the different SOFC designs under development, (See "Proceedings of the First to Fourth International Symposiums on Solid Oxide Fuel Cells," *Electrochemical Soc.*, Pennington, 1989, '91, '93, and '95 respectively.; and *Fuel Cell Seminar Abstracts*, Palm Springs, Calif., USA, November, 1998.) the sealless tubular design is recognized as the design closest to commercialization. As shown in FIG. 1, the design consists of a porous inner air electrode support cathode tube 10, made of a doped lanthanum manganite ($LaMnO_3$) material having 30–35% porosity, an intermediate zirconia electrolyte layer (a gas-tight layer of $ZrO_2$-8 mol % $Y_2O_3$) 11, a porous fuel electrode 12 on the outer surface made of a nickel-zirconia cermet material and an interconnection (gas-tight) 13, made of a doped $LaCrO_3$ material. The main challenge presented by the tubular design is to reduce the cost of the cell without negatively impacting other properties, for example, cell performance, resistance to thermal cycles, total lifetime, etc.

At the present time, the expensive electrochemical vapor deposition (EVD) technique, which is a major factor affecting costs is used for depositing the gas-tight electrolyte. As a result, there is a worldwide effort underway to replace electrochemical vapor deposition with less expensive deposition techniques.

Several non-EVD fabrication approaches to depositing electrolyte films over porous air electrode supported (AES) cathode tubes have been reported in the literature in an attempt to replace the expensive EVD process. With these approaches, most of the deposited particulate coatings of zirconia must be sintered to achieve full density. These approaches include low pressure plasma spray, N. Hisatome et al, *Proceedings of the Fifth International Symposiums on Solid Oxide Fuel Cells*, Eds. U. Stimming et al., Electrochemical Soc., Pennington, p. 180, 1997 and *Fuel Cell Seminar Abstracts*, Palm Springs, Calif., USA, November, p.28, 1998., vacuum plasma spray, G. Schiller et al., *Proceedings of the Fifth International Symposiums on Solid Oxide Fuel Cells*, Eds. U. Stimming et al. Electrochemical Soc., Pennington, p. 635, 1997 and *Fuel Cell Seminar Abstracts*, Palm Springs, Calif., USA, November, p. 515, 1998., and colloidal processes such as slurry-based dip or spray coating, S. Swartz et al., *Fuel Cell Seminar Abstracts*, Palm Springs, Calif., USA, November, p. 72, 1998. The plasma and vacuum spray techniques have high equipment and accessory costs. The colloidal approaches are much cheaper. However, dip and spray coating have poor reproducibility and control over the thickness of the deposited film.

Electrophoretic deposition is a colloidal process in which charged particles dispersed in a stable suspension are driven to move towards an oppositely charge electrode, upon which they ultimately deposit, to build up a particulate coating. The technique is extremely inexpensive and has been used for many years to fabricate green ceramic bodies and coatings with different shapes for applications ranging from ceramic/ceramic and metal/ceramic composites to thin/thick film coatings for electronic devices (P. Sarkar and P. S. Nicholson. *J. Am. Ceram. Soc.*, 79, 1987 (1996); L. Vandeperre and O. Van Der Biest. *Key Engineering Materials*. 132–136, 2013 (1997); and N. Koura, A. Taniguchi, H. Shoji, S. Ito and Y. Takayama. *J. Ceram. Soc.* Jpn., Int. Edition 104, 810 (1996)). This processing technique is especially useful for the preparation of uniform particulate coatings with high green densities (50–60%) and controlled thickness. The present investigation explores EPD as a processing technique for producing high density films for SOFC electrolytes on AES porous doped $LaMnO_3$ (LDM) cathode tubes. The films are produced in the unfired state, and they are later fired to produce the full density and hermetic seal required of the electrolyte layer. To date, the primary reason EPD has not been used to produce zirconia electrolytes for solid oxide fuel cells is the lack of a viable EPD chemistry and process developed specifically for SOFC applications.

To our knowledge, the only published account of using EPD for the production of zirconia electrolytes for SOFC's was reported in 1993, T. Ishihara et al., *Proceedings of $3^{rd}$ Intl. Symposium on SOFC* (p. 65, 1993); *Proceedings. of $4^{th}$ Intl. Symosium on SOFC* (p. 334,1995); and *J. Am. Ceram Soc.*, 79, 913 (1996). In these basic studies, zirconia electrolyte films were deposited on disc-shaped substrates of porous Sr-doped $LaMnO_3$ (LSM) cathode and anode (Ni—YSZ) materials using at least 6 deposition steps, each followed by a sintering step. This method is not suitable for mass production for several reasons: 1) the suspension chemistry is subject to high variability (strongly dependent on iodine concentration in an acetylacetone solvent), 2) the principle has been demonstrated only on flat samples with small dimensions (20 mm discs, in the case of the LSM substrates), and 3) the technique of multiple deposition and sintering steps is complicated, time-consuming, and inordinately expensive. In addition, without the multiple deposition steps, a gas-tight electrolyte layer, and hence acceptable fuel cell performance, cannot be obtained.

SUMMARY OF THE INVENTION

It is one object of this invention to provide a method for deposition of electrolyte films on porous substrates.

It is another object of this invention to provide a method for deposition of electrolyte films on porous electrodes which are three-dimensional, such as tubular configurations, as well as flat configurations.

It is yet another object of this invention to provide a method for deposition of electrolyte films on porous electrodes which is suitable for mass production use.

It is still another object of this invention to provide a method for deposition of electrolyte films on porous electrodes which requires only one deposition step in order to achieve a gas-tight electrolyte layer.

It is another object of this invention to provide an apparatus for depositing an electrolyte film on a porous electrode substrate.

These and other objects of this invention are addressed by a method for deposition of an electrolyte material on a substrate in which a suspension comprising a polar solvent and a plurality of particles having a controlled surface charge is formed. The particles are made of compounds suitable for use as an electrolyte. A porous substrate having a composition suitable for use as an electrode (hereinafter referred to as a "substrate electrode") is immersed in the suspension which is in contact with a counter electrode. A voltage is then applied across the suspension between the counter electrode and the substrate electrode resulting in migration of at least a portion of the particles toward the substrate electrode and deposition of the particles on the substrate electrode to produce an electrolyte layer on the substrate electrode.

The method for preparation of electrolyte films in accordance with this invention requires only one deposition step, and produces films of similar quality to those obtained by the expensive but conventional EVD process. A major technical hurdle that is overcome by the method of this invention is the ability to lay down high quality films on a porous substrate. In the case of porous substrates, as soon as an electric field is applied for EPD, a problem arises resulting from the field around the pore and, thus, the deposition rate around the pore, being greater than that in surrounding non-porous areas, resulting in uneven potential field distribution, which, in turn, precludes obtaining a gas-tight electrolyte after only one deposition step. In accordance with one particularly preferred embodiment of this invention, an intermediate fugitive layer of electrically conductive material is used to fill in the pores and even out the deposition process. Because the intermediate conducting layer is fugitive (it sublimes when heated), there is no trace of it left in the final product, and the electrolyte is attached directly to the porous substrate. In addition, the fugitive interlayer technique appears to prevent another problem usually seen in particulate coatings that are later sintered, namely, the creation of an unwanted insulating phase, $La_2Zr_2O_7$. This phase forms due to a chemical reaction at the $LaMnO_3$/YSZ interface when that interface is heated above 1300° C. In the case of a fugitive interlayer, the sublimation of the interlayer creates a small gap that prevents the two sides of the interface from coming into contact during much of the time the YSZ layer is sintering. The gap ultimately disappears and intimate contact is eventually established between the two sides, but the time spent in contact is much shorter than when the interlayer approach is not used. And, finally, as will be seen in the results presented herein, the use of a fugitive interlayer improves the ability of the electrolyte to sinter to full density in only one sintering step, in part because it is not constrained by the substrate electrode during much of the sintering.

BRIEF DESCRIPTION OF THE DRAWINGS

These and other objects and features will be better understood from the following detailed description taken in conjunction with the drawings wherein.

DESCRIPTION OF PREFERRED EMBODIMENTS

Figure 1:
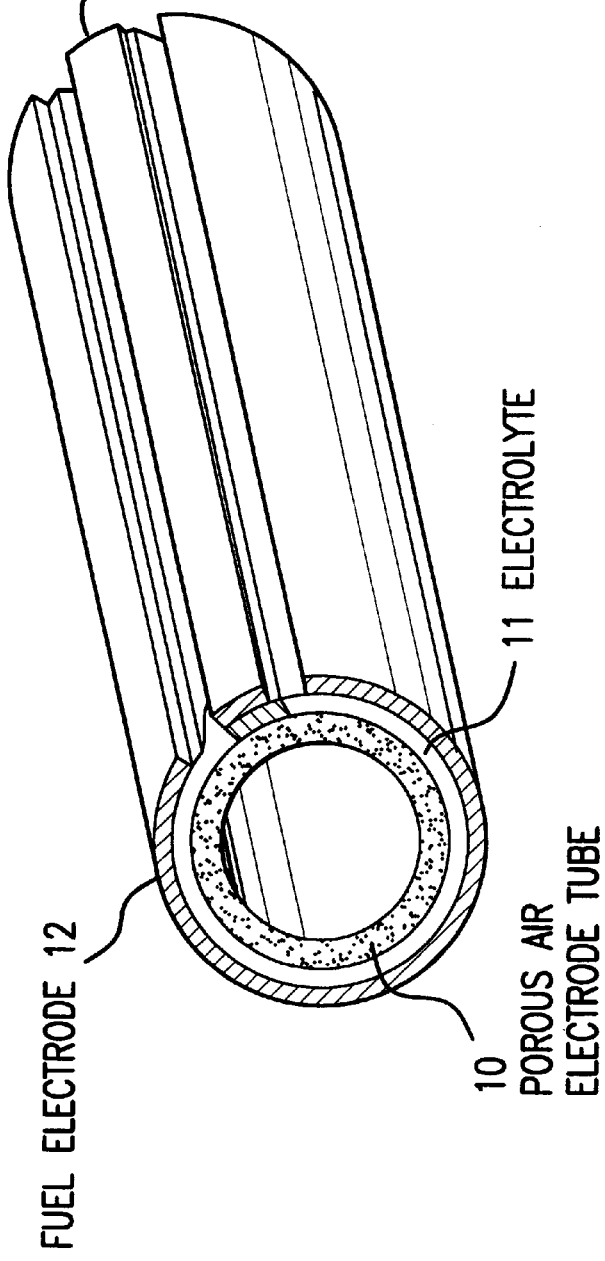
FIG. 1 is a diagram of a tubular air electrode supported solid oxide fuel cell.

The invention disclosed and claimed herein is a method and apparatus for electrophoretic deposition of an electrolyte material on a porous substrate electrode. The method entails formation of a suspension of particles suitable for use as an electrolyte and having a controlled surface charge, immersing a porous substrate material, which comprises an electrode material, in the suspension, or otherwise providing contact between the porous substrate and the suspension, and applying a voltage across the suspension whereby the charged particles migrate toward the porous substrate and are deposited thereon, forming a "green" electrolyte layer on the porous substrate. In accordance with one preferred embodiment, the particles comprise yttria stabilized zirconia ($ZrO_2$—$Y_2O_3$)(YSZ) and the substrate comprises doped $LaMnO_3$. Other suitable particle compositions include $BaCeO_3$—$CaO$, $BaCeO_3$—$Gd_2O_3$, $CeO_2$—$Sm_2O_3$, $ZrO_2$—$CaO$, and $ZrO_2$—$MgO$. In accordance with another embodiment of this invention, the substrate comprises Ni—YSZ. After formation of the "green" electrolyte layer, the coated substrate is sintered at a temperature commensurate with the sintering temperature of the particulate material; in the case of 0.20 μm YSZ particles, the temperature is greater than about 1200° C., preferably in the range of about 1200° C. to about 1400° C.

In accordance with one preferred embodiment of this invention, a fugitive electrically conductive material is deposited on the porous substrate prior to deposition of the electrolyte particles on the substrate. Although other methods of deposition may be employed, a particularly preferred method of deposition of the fugitive electrically conductive material is by sputtering. When applied, the fugitive electrically conductive material homogenizes the conductivity of the porous substrate, forming a more electrically uniform surface upon which to deposit the electrolyte particles. During further processing of the substrate coated with the electrolyte particles, the fugitive electrically conductive material disappears as a result of evaporation, dissociation or sublimation. In accordance with one preferred embodiment, the fugitive electrically conductive material is one which evaporates, dissociates or sublimes at temperatures less than about 1250° C. In accordance with one particularly preferred embodiment of this invention, the fugitive electrically conductive material is graphite. As used herein, the term "graphite" includes carbon.

Successful electrophoretic deposition (EPD) requires a stable suspension with well-dispersed particles having a controlled surface charge. Thus, preparation of a particulate suspension with a carefully defined chemistry prior to conducting EPD is essential. Liquid media suitable for use in the suspension are any non-aqueous polar solvents. Water is not suitable as a liquid medium because application of a voltage to water causes the evolution of $H_2$ and $O_2$ gases. Depending upon whether the substrate upon which the electrolyte is deposited is to be employed as an anode or cathode electrode, the liquid medium may be an acid or a base. A particularly preferred liquid medium, which is both inexpensive and usable by itself, is acetic acid.

EXAMPLE

Suspension Preparation

The first step in suspension preparation is powder washing. The powders used in the instant case were submicron ($d_{50}$=0.17 μm) commercial $ZrO_2$-8 mol % $Y_2O_3$ powders (TZ-8Y brand, Tosoh Ceramics Division, New Jersey, USA). Powder treatment (laundering with deionized water) prior to suspension preparation for EPD is required to remove the surface ion impurities. Usually, surface ion impurities arise from the chemical precursors that were used in the original synthesis of the powder. The Tosoh brand TZ-8Y powders are synthesized by a co-precipitation technique, using chloride precursors (e.g., $ZrOCl_2$). Chloride ions are therefore the major surface impurities. Removal of these ions is very important, since impurities can affect suspension stability, and hence deposition characteristics and, later, sintering behavior. In the instant case, powder washing was accomplished by eight successive laundering cycles followed by redispersing (after each washing) with deionized water. Powder loading was around 4 vol %. Impurity levels were monitored from electrical conductivity measurements and from elemental analysis (by inductively coupled plasma, ICP) conducted on the supernatants. To avoid agglomeration during drying, three additional washing and redispersing cycles were performed with dehydrated ethanol (200 proof, Pharmco, USA). The powders were then dried in an air oven at 80° C.

Ninety-nine percent pure glacial acetic acid (J. T. Baker) was used as a solvent to prepare a suspension of 2.5–7.5 wt % TZ-8Y powder (washed) using ball milling (12 hrs.) followed by ultrasonication (4 hrs.). The suspensions were then allowed to sit undisturbed for 6 hrs to settle out possible large agglomerates. The zeta potential of the suspension at room temperature was around 50 mV (measured in a Coulter Delsa 400), which indicates the development of positively charged zirconia particles when acetic acid is used as a solvent. During deposition, when an electric field is applied, these positively charged particles will move towards the cathode (the conducting porous doped $LaMnO_3$ tube) and form a deposit thereon.

Substrate Preparation

In this example, the porous air electrode support for the solid oxide fuel cell cathode was in the form of doped $LaMnO_3$ tube sections (dimensions 2.2 cm in diameter, 2.2 mm thick and 2" in length) which were obtained from Siemens-Westinghouse. After thorough washing in ethanol, the tube sections were dried in an air oven overnight at 80° C. Prior to deposition of the zirconia layer by electrophoretic deposition, a fugitive conducting phase, carbon, was sputtered onto the washed and dried porous doped $LaMnO_3$ substrates. The carbon interlayers were deposited using a high vacuum sputtering apparatus with a pure ⅛" diameter graphite rod (Carbon of America, Ultra Carbon Division, USA). Because of the cylindrical geometry of the tubes, a small DC motor and special housing were constructed and placed inside the vacuum chamber. These enabled constant rotation of the doped $LaMnO_3$ tube at 70 RPM while sputter deposition of the carbon was occurring. The deposition time was varied between 12 and 72 seconds. It was not possible to continuously apply graphite by sputter deposition, because a maximum 12 second deposition time was allowed by the sputtering unit. Hence, to obtain thicker carbon interlayers, the sputtering experiments had to be conducted several times. Deposition sequences (number of 12 second depositions), deposition time and the corresponding graphite thickness (approximate) are shown in Table 1.

TABLE 1

| Deposition Sequence | Deposition Time, (s) | Approximate Thickness (nm) |
|---|---|---|
| 1 | 12 | — |
| 2 | 24 | 180 |
| 4 | 48 | 370 |
| 6 | 72 | 750 |

Figure 2A:
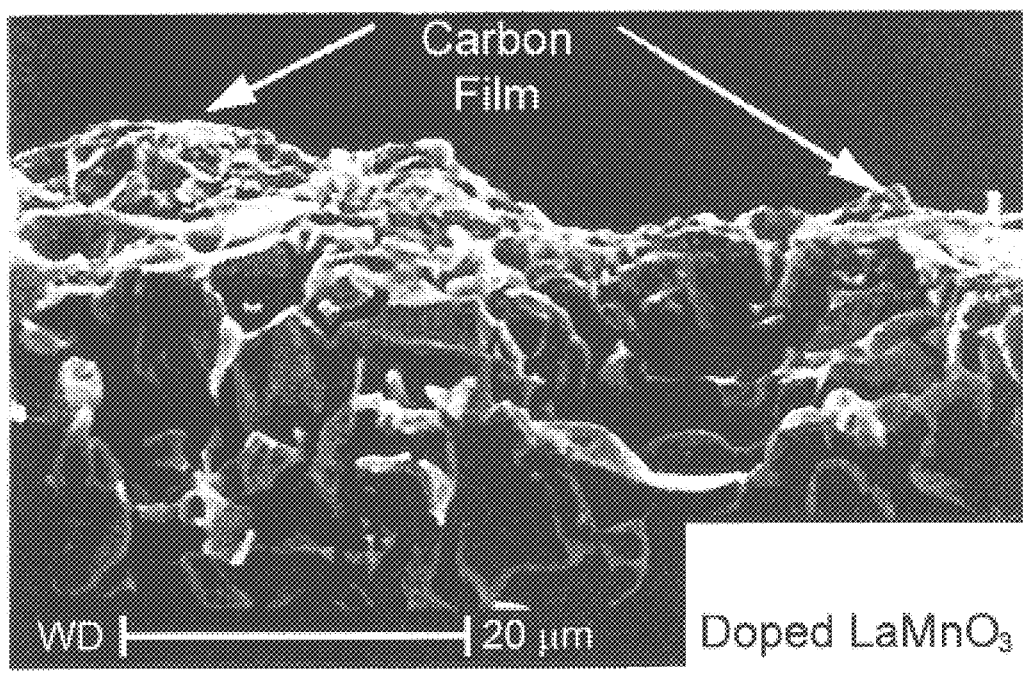
FIGS. 2a and 2b are SEM cross-sectional views of a sputter-coated carbon film on a porous doped $LaMnO_3$ cathode electrode tube at low magnification and high magnification, respectively.
Figure 2B:
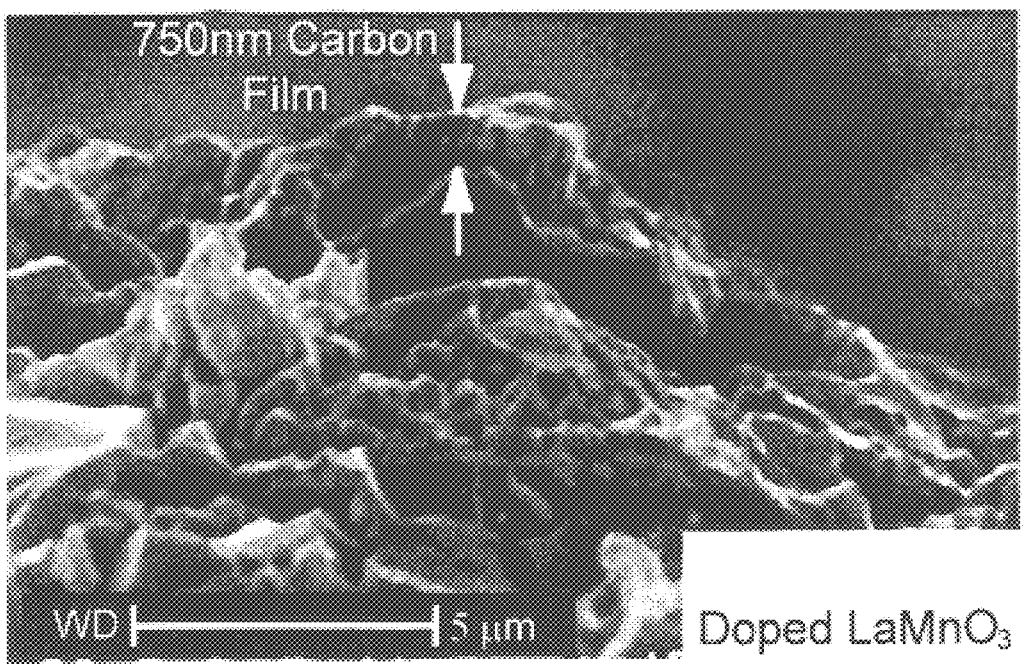

In each case, the thickness (approximate) of carbon films was estimated by viewing carbon/doped $LaMnO_3$ cross-sections under scanning electron microscopy (Philips XL 20). A typical SEM image for a 72 second deposition is shown in FIG. 2. It was not possible to measure the thickness of a 12 second deposition (Table 1). Also, the dimensions of the sputtering apparatus restricted the size of the sample that could be used. Alternatives to sputtering for deposition of the fugitive carbon phase on porous doped $LaMnO_3$ include a chemical vapor deposition (CVD) approach and an evaporation approach. The principles demonstrated with the fugitive interlayer should remain the same regardless of how the interlayer is applied; however, the results shown herein are from only the sputter-coated fugitive graphite interlayer on porous doped $LaMnO_3$ substrates.

Description of the Electrophoretic Deposition Cell

Figure 3:
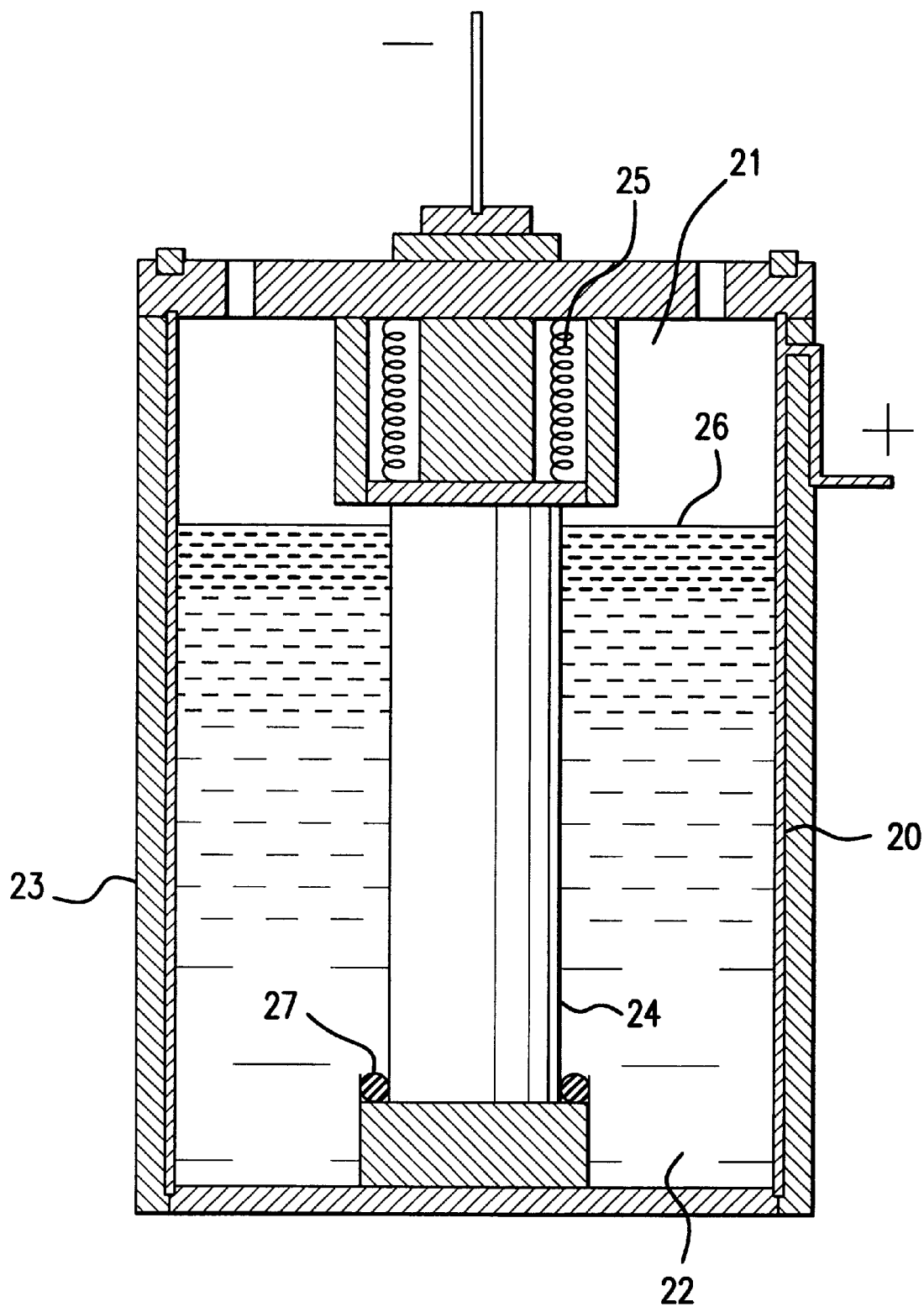
FIG. 3 is a schematic diagram of a system for deposition of an electrolyte upon a tubular substrate electrode in accordance with one embodiment of this invention.

Doped $LaMnO_3$ (LDM) tubes, both with and without graphite interlayers, were prepared for subsequent electrophoretic deposition. A diagram of an apparatus for EPD which allows zirconia deposition on the outside of a tubular sample while preventing simultaneous deposition on the sample's inner surface is shown in FIG. 3. A cylindrical stainless steel tube 20 with both ends 21, 22 open acts as an anode and is placed inside a Teflon cylindrical container 23. The LDM tube 24 is placed inside the metallic anode 20 by means of a spring-loaded arrangement 25 to ensure proper electrical contact during deposition. The LDM tube 24 acts as a cathode and, in the presence of the suspension 26, positively charged zirconia particles are deposited over the outside surface of the porous ceramic tube 24 when voltage is applied from an external circuit (not shown). An 'O'-ring 27 is used at the bottom of the porous ceramic tube 24 to prevent the suspension 26 from entering inside the tube.

Two electrophoretic cells of the type shown in FIG. 3 with different spacings between the anode and the cathode, typically 10 mm and 15 mm, were used in this example. All experiments were performed using these cells with an applied voltage varying between 25 and 150V for different times (30–300 seconds) using an Acopian high voltage power supply. The time of deposition was monitored using an ordinary digital stop watch. Similar cells of differing lengths can be used to deposit zirconia on porous LDM tubes also having differing lengths.

Deposition of Zirconia Electrolyte on Porous LDM Tubes

Figure 4A:
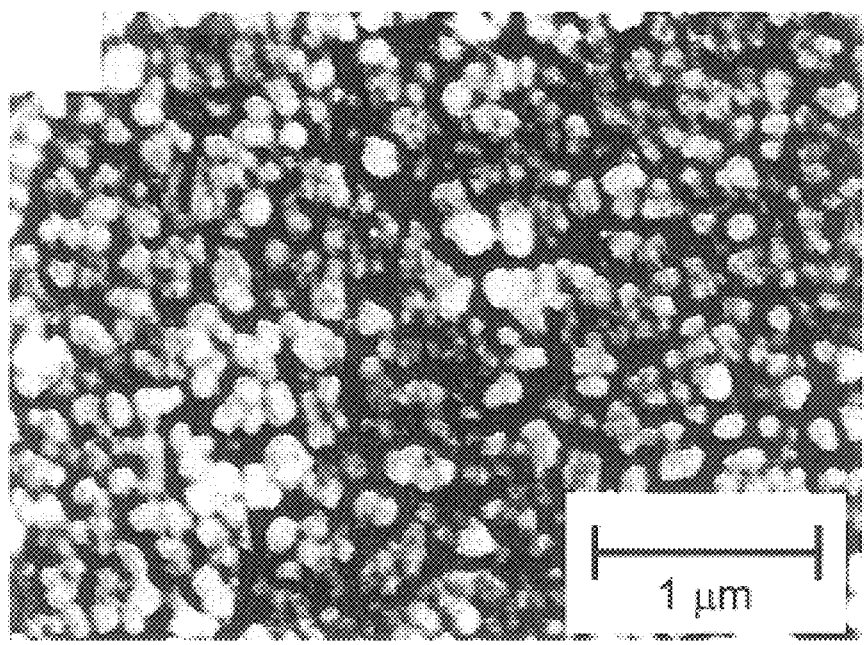
FIGS. 4a and 4b show the surface morphology of an as-deposited (green) zirconia film on a porous doped $LaMnO_3$ cathode electrode tube without (a) and with (b) a graphite interlayer.
Figure 4B:
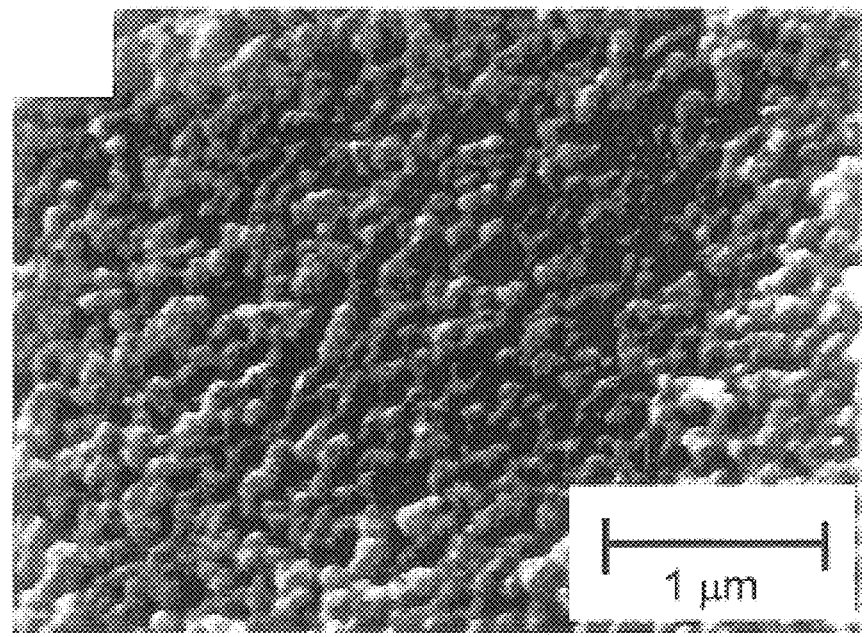

Using the electrophoretic cell as shown in FIG. 3, the deposition experiments were carried out. After positioning the porous LDM tube, the suspension of zirconia particles in acetic acid was poured carefully into the Teflon cylindrical container, so that the suspension filled the cavity between the metallic tube and the outside surface of the porous LDM tube. Special care was taken to avoid pouring the suspension inside the cavity of the LDM tube. Porous LDM tubes, both with and without fugitive graphite interlayers, were used for deposition experiments. After deposition of the zirconia coating, the tubular samples were dried in an oven at 60° C. under gentle flowing air (50–70 cc/min) for about 1 hour. The surface morphology of the dried, as-deposited zirconia EPD films for both types of samples (with and without graphite interlayers) showed distinct differences in their microstructures. A much better quality coating, with complete coverage and more uniformity in thickness and a real packing density, was observed when the fugitive graphite interlayer was used (FIG. 4b), compared to when the as-received tube surface (without interlayer) was used (FIG. 4a). It was observed in both cases that the deposited zirconia films were completely crack free.

The lower surface roughness and better particle packing density (>55% vs ≈45% by volume) of the coatings produced using graphite interlayers was attributed to the more controlled deposition and equipotential electric field distribution created on the porous substrate when the interlayer was present. The thicknesses of as-deposited zirconia films were measured by scanning electron microscopy (SEM) and were found to vary between 10 and 50 μm, depending on the concentration of zirconia particles used in the suspension and on the time and voltage used in the EPD experiment.

Sintering of the EPD-Deposited Zirconia Electrolyte on Porous LDM Tubes

Figure 5A:
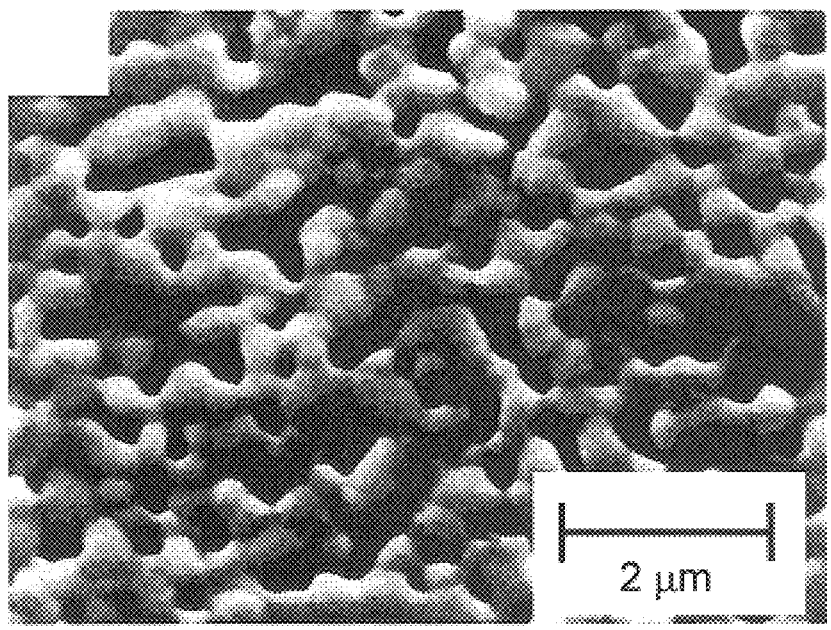
FIGS. 5a and 5b show the surface morphology of a zirconia film sintered at 1250° C. (a) without and (b) with a graphite interlayer.
Figure 5B:
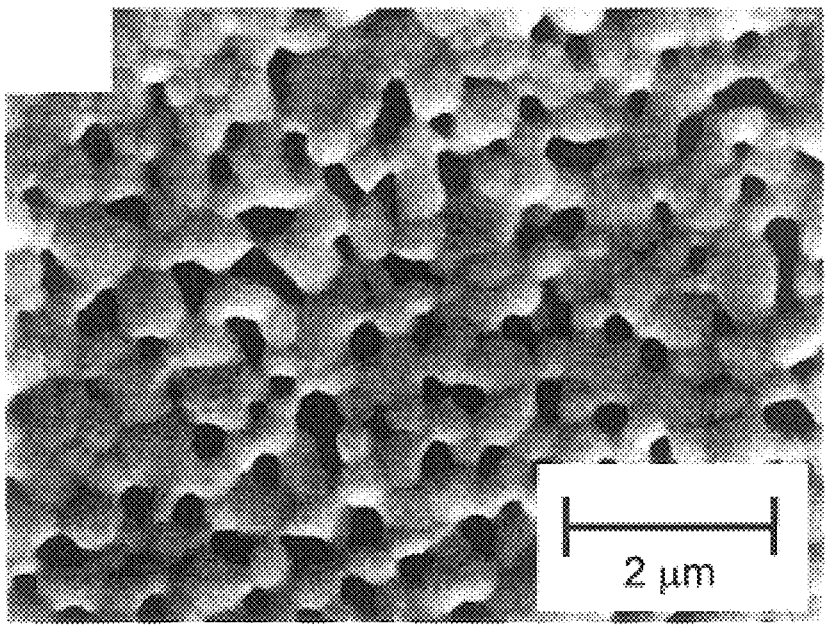
Figure 6A:
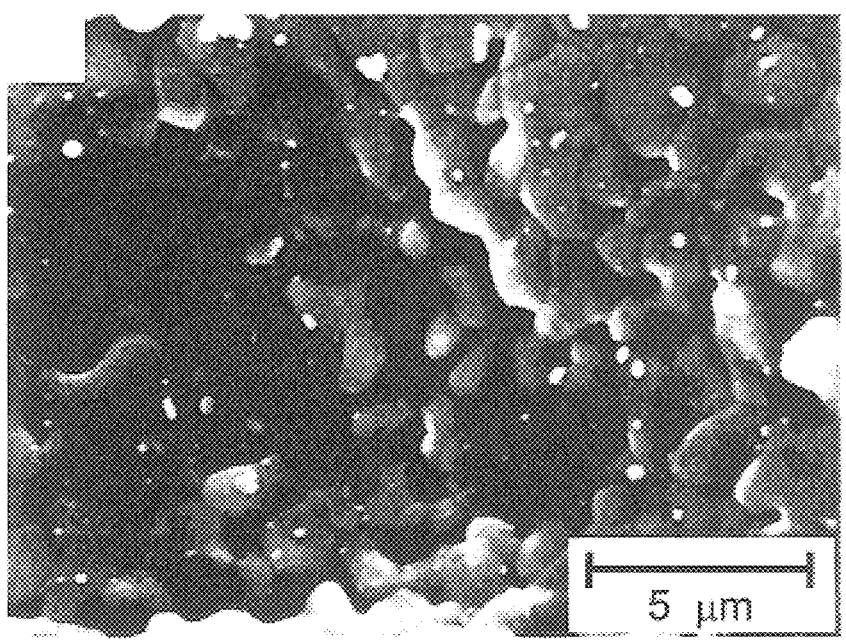
FIGS. 6a and 6b show the surface morphology of a zirconia film sintered at 1300° C. (a) without and (b) with a graphite interlayer.
Figure 6B:
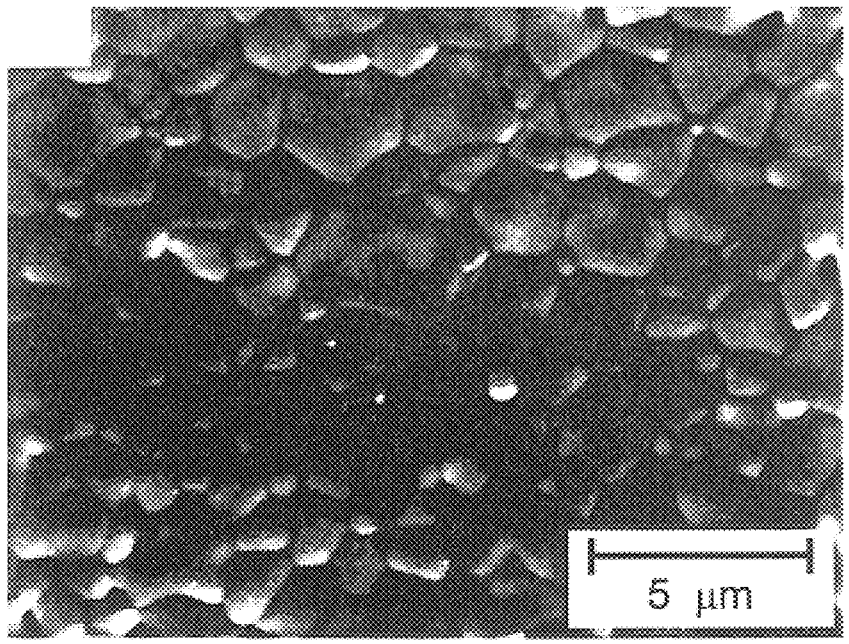
Figure 7A:
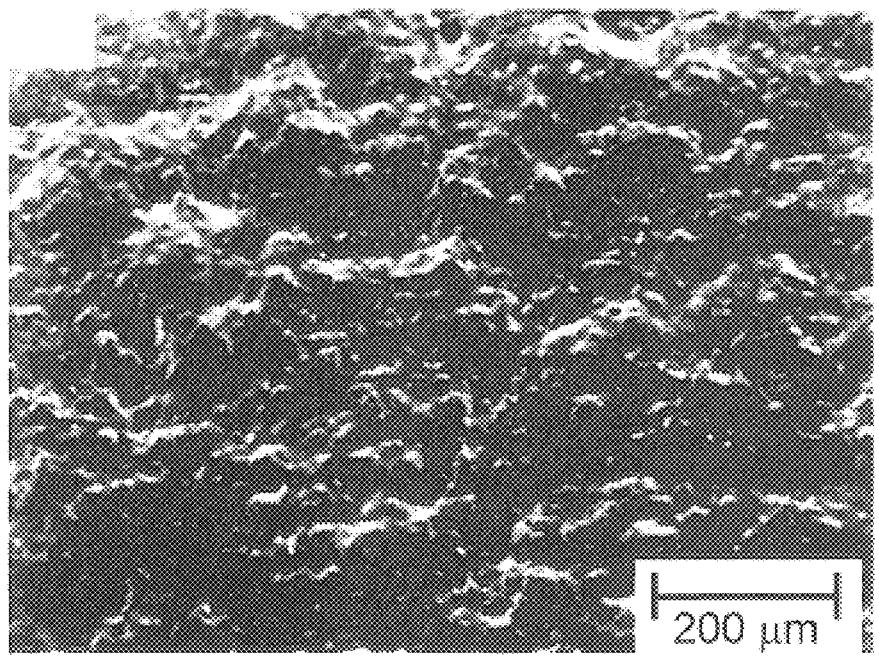
FIGS. 7a and 7b show the surface morphology at low magnification of a zirconia film sintered at 1300° C. (a) without and (b) with a graphite interlayer.
Figure 7B:
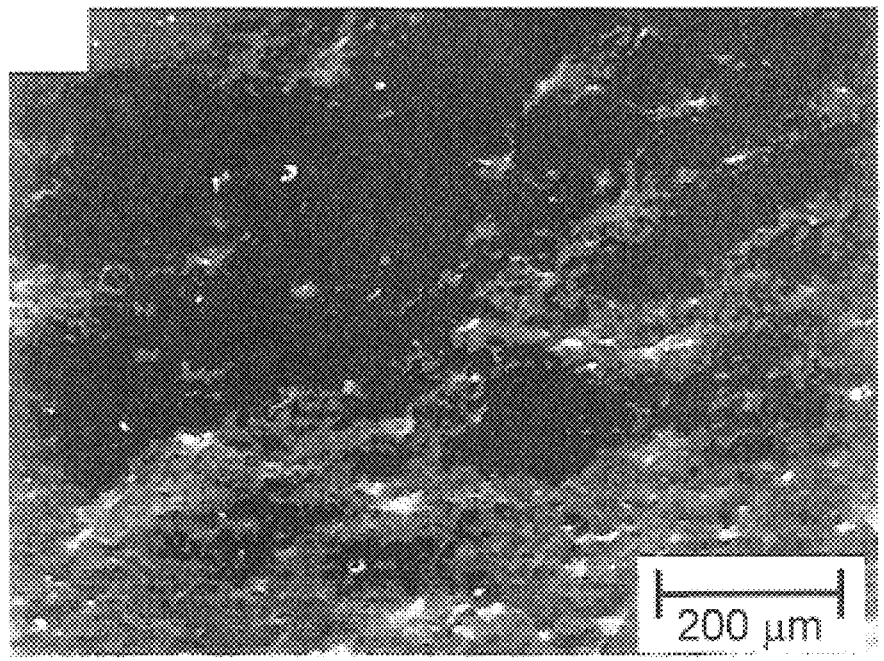

The green films—both with and without graphite interlayers—were then sintered between 1200 and 1300° C. for 2 hours in air. No distinct difference in surface morphology was observed for the two sets of samples when fired at 1200° C., but differences began to evolve at 1250° C. The samples without interlayers had more pores, larger pores, a less even surface topology, and a less uniform grain size distribution (FIG. 5(a) without interlayer and FIG. 5(b) with interlayer). These differences become very pronounced at 1300° C. (FIGS. 6(a) and 7(a) without interlayer and FIGS. 6(b) and 7(b) with interlayer). However, none of the zirconia coatings showed any evidence of cracking upon sintering, regardless of whether an interlayer was present or not.

Figure 8A:
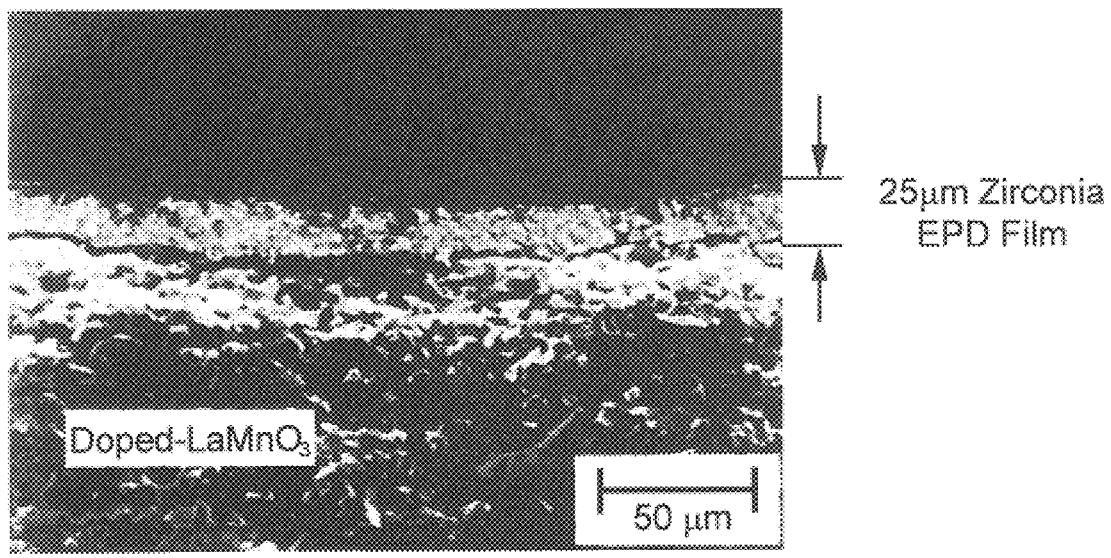
FIGS. 8a and 8b are cross-sectional views of doped $LaMnO_3$/zirconia films sintered at (a) 1250° C. and (b) 1300° C. where a fugitive graphite layer was employed in accordance with one embodiment of this invention.
Figure 8B:
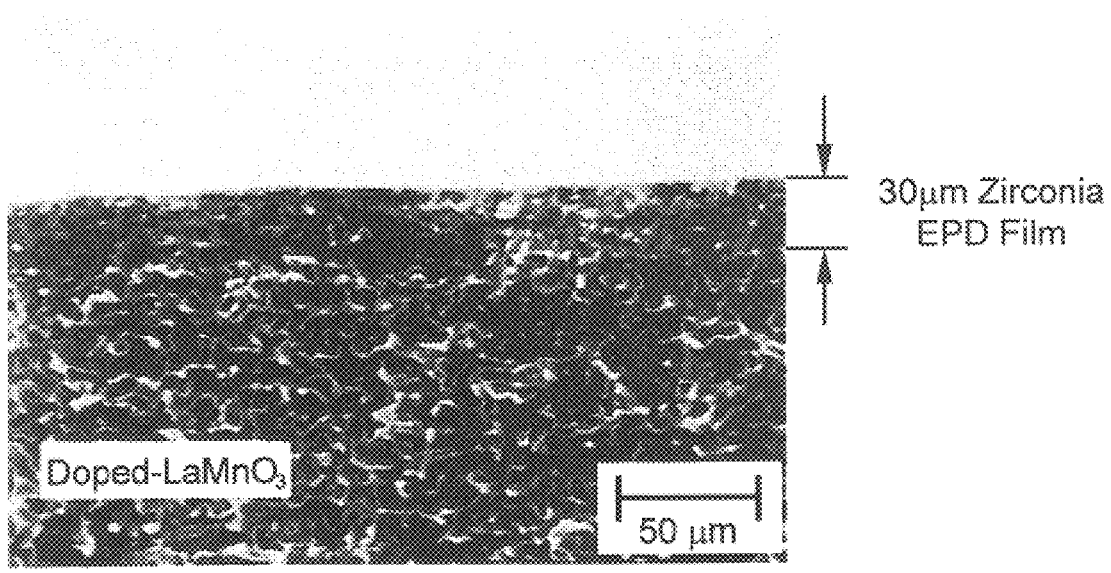
Figure 9A:
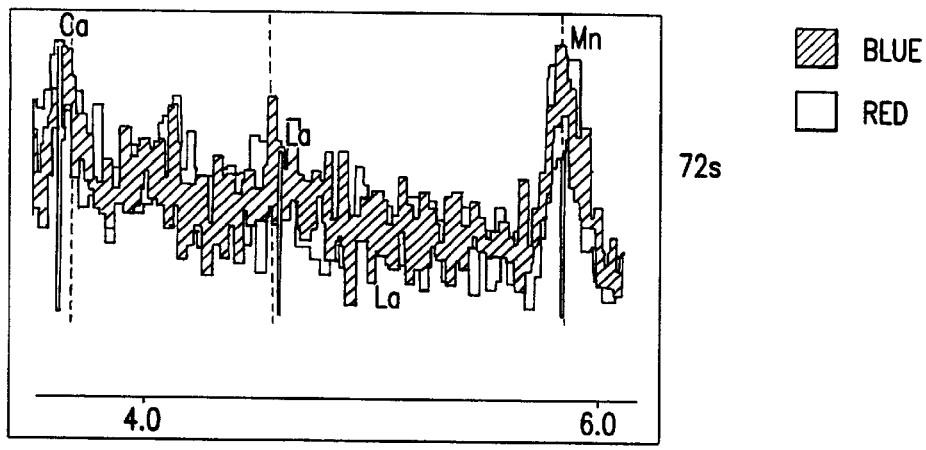
FIG. 9 is a diagram showing EDX data for samples with graphite interlayers of varying thickness after firing at 1350° C. for four hours.
Figure 9B:
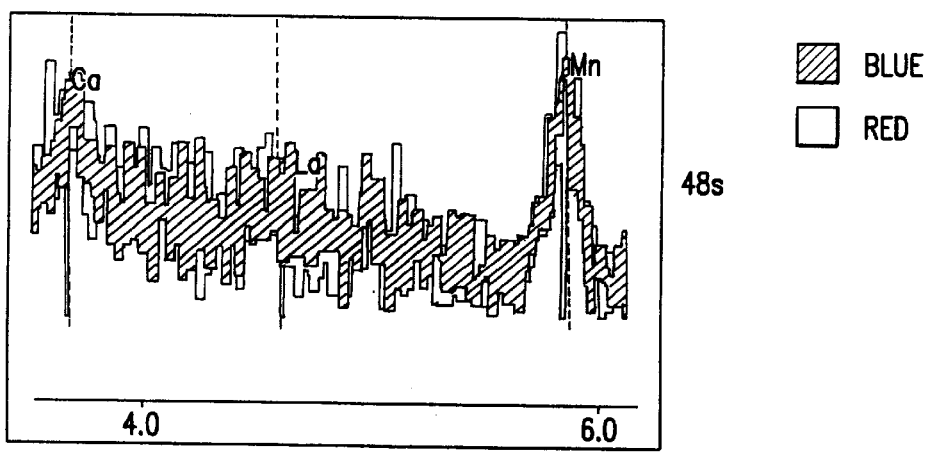
Figure 9C:
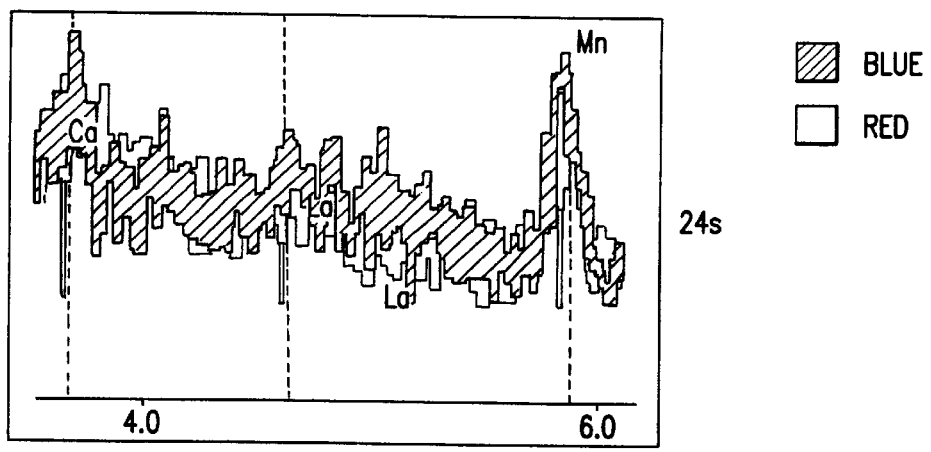
Figure 9D:
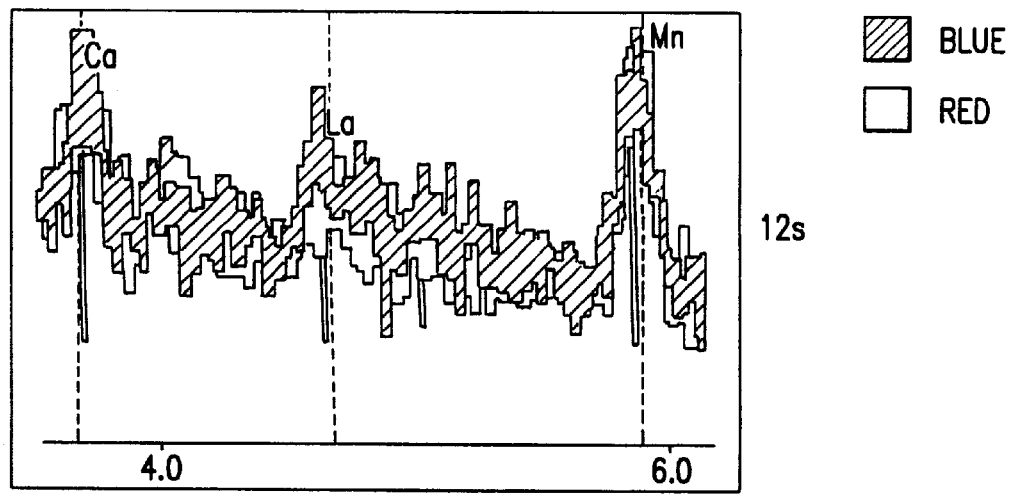
Figure 9E:
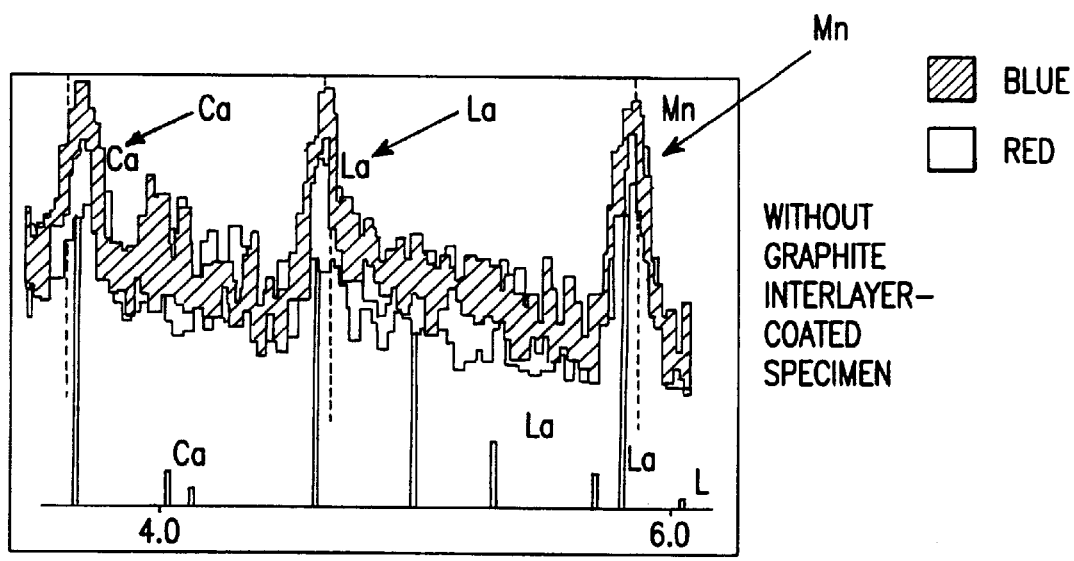

Interestingly, while viewing the cross-sectional image of the presintered (1250° C.) interlayer-coated specimens, it was observed that the zirconia films had become largely detached with respect to the LDM substrate (FIG. 8a). This detachment occurs due to the burnout of the intermediate graphite interlayer. FIG. 8b, however, shows that increasing the sintering temperature to around 1300° C. results in the reattachment of the coating such that the zirconia film is completely and strongly bonded to the LDM substrate over the entire contact area. Thus, at 1300° C., a clean and complete bond between the zirconia coating and the LDM substrate is achieved, with no evidence of the fugitive graphite interlayer used in the prior deposition step. After sintering/joining was completed, no residual impurities from the interlayer were detected at the interface between the LDM and the YSZ. However, the debonding of the coating from the substrate early in the sintering process was an unexpected but potential benefit of the graphite interlayer technique. Because the shrinkage of the coating was not overly constrained by its attachment to the substrate, the problems associated with constrained sintering—e.g., the development of large shrinkage voids and/or cracks, were not observed. In addition, the independent sintering of the zirconia coating away from the substrate may have reduced the problem of Mn and La diffusion from the substrate as compared to coatings produced without interlayers.

Energy dispersive x-ray (EDX) analysis was performed on polished cross-sections of sintered zirconia films on LDM substrates, with and without carbon coating (prior to EPD). Each sample represented a different graphite interlayer thickness, as listed in Table 1. Electron probe micro analysis (Cameca Camebax SX-50), using a 2 μm diameter spot size, was conducted at two locations in each zirconia film—one location very near the YSZ/LDM interface and one location far away from the interface near the top of the zirconia film.

FIG. 9 shows a systematic EDX analysis of sintered zirconia films on LDM substrates with varying thicknesses of carbon interlayers. For reference, a LDM sample (no graphite interlayer) is also shown (at the bottom). All samples were fired at 1350° C. for 4 hours under identical conditions. The two lines (blue and red in color) in each plot represent EDX traces from the two locations tested in each zirconia film—one taken near the zirconia/LDM interface (blue color), and one far away from the zirconia/LDM interface (red color). As can be seen in FIG. 9, only a small difference in results between these two locations was observed. However, significant variations in La peak heights are observed. A maximum La signal is obtained for samples with no interlayer (at the bottom). The peak height then decreases substantially with increasing thicknesses of the graphite interlayer (towards the top). Complete shielding of La diffusion into the sintered zirconia film was observed when fugitive graphite phases of 370–750 nm were present (sputter deposition times of 24 and 72 seconds). Interestingly, no such noticeable difference in peak heights was observed for Ca and Mn diffusion, when comparing specimens with and without fugitive interlayers. Similar Ca, Mn and La diffusion profiles into the zirconia film were observed in specimens sintered at a temperature of approximately 1300° C. (figure not shown).

Presumably, the limited diffusion of atoms from the substrate into the LDM zirconia films is due to the initial de-attachment of the film with respect to the substrate, prior to its reattachment in the fully sintered condition. The lack of La diffusion through the sintered zirconia film is significant, in that it precludes the formation of the undesirable, electrically insulating $LaZr_2O_7$ phase which otherwise typically occurs by reaction of La with $ZrO_2$ at temperatures >1300° C. In addition to superior particle packing during deposition and unconstrained sintering, both of which promote superior film densification, the lack of La diffusion into the zirconia coating is a significant advantage of the fugitive interlayer approach and has tremendous potential, because many inexpensive electrolyte fabrication techniques require firing the film after green deposition. Therefore, the fugitive interlayer approach can be applied to other electrolyte deposition techniques (e.g., slurry based dip or spray coating etc.) to prevent La-diffusion during high temperature firing.

Figure 10A:
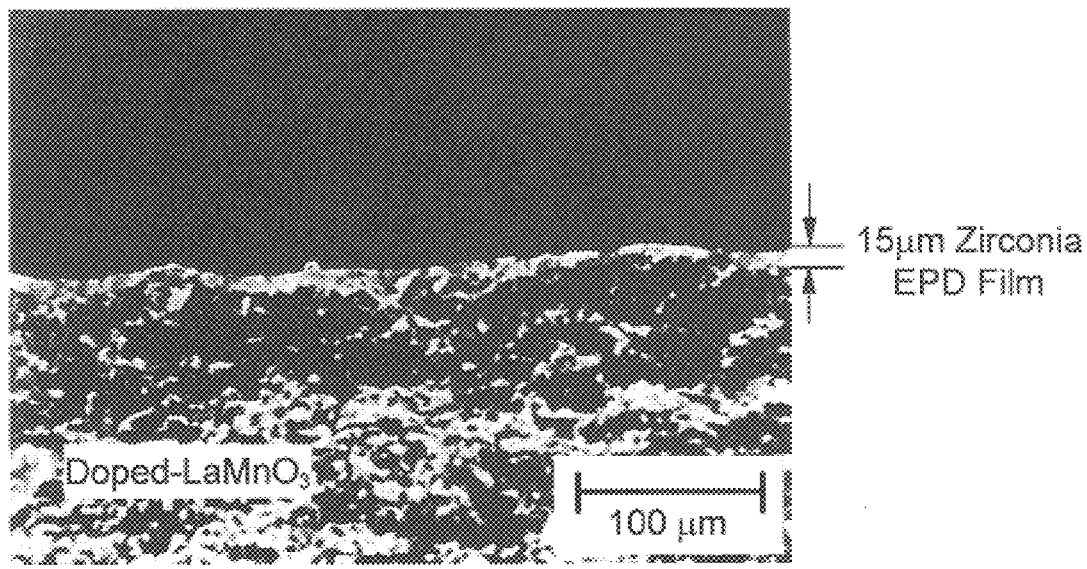
FIGS. 10a and 10b are cross-sectional views of doped $LaMnO_3$/zirconia films sintered at (a) 1250° C. and (b) 1300° C. where no interlayer was used.
Figure 10B:
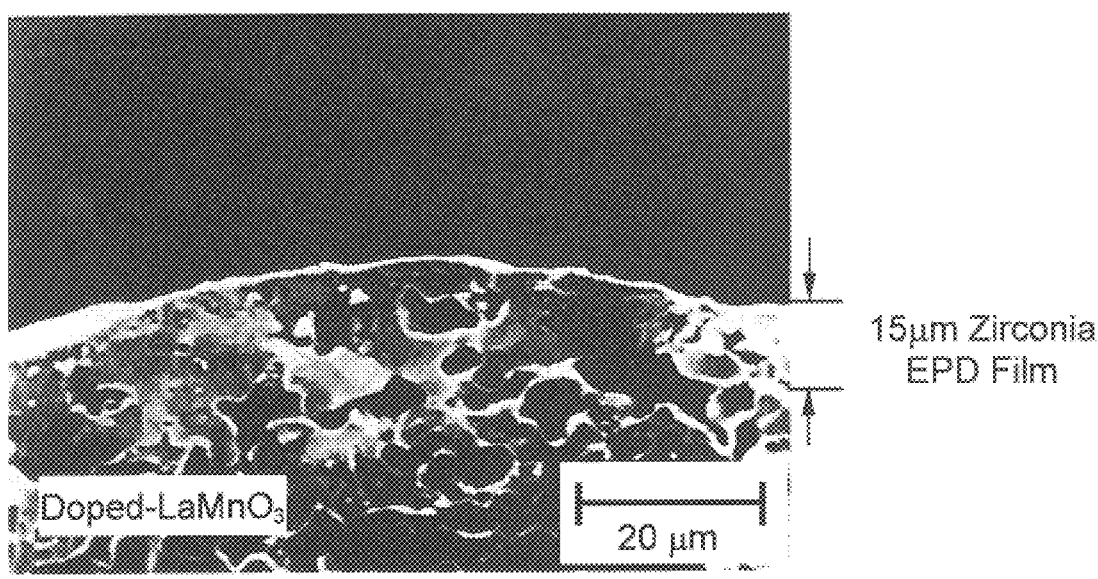

In cross-sectional observations of samples produced without interlayers, no free-floating state for the zirconia films (i.e., detachment from the LDM surface) was observed at 1250° C. (FIG. 10(a)). Instead, these zirconia films started sintering along with the substrate, and, at the final sintering temperature of 1300° C., attained a non-uniform film thickness with a rough surface morphology (FIG. 10(b)).

Figure 11A:
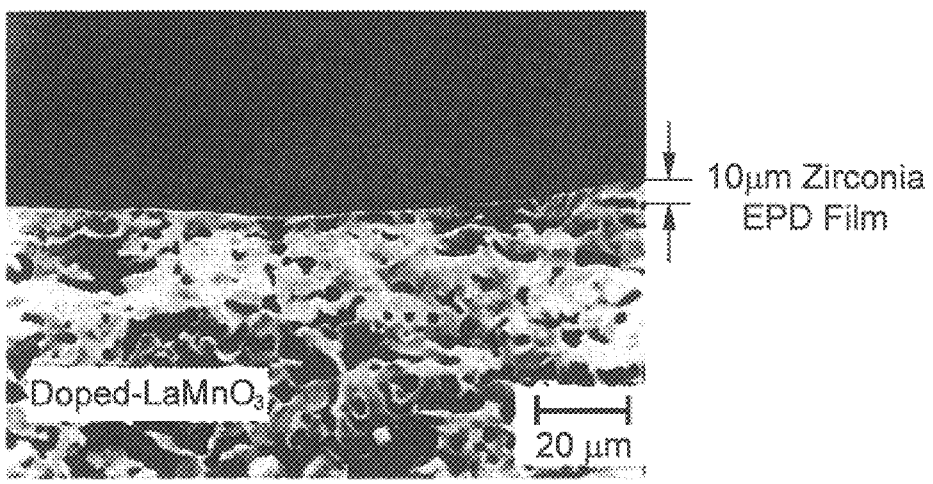
FIGS. 11a, 11b and 11c show zirconia films sintered at 1300° C. of various thicknesses on porous doped $LaMnO_3$ cathode electrode tube surfaces for applied deposition fields and times of (a) 100V/cm, 30s; (b) 50V/cm, 60s and (c) 50V/cm, 120s.
Figure 11B:
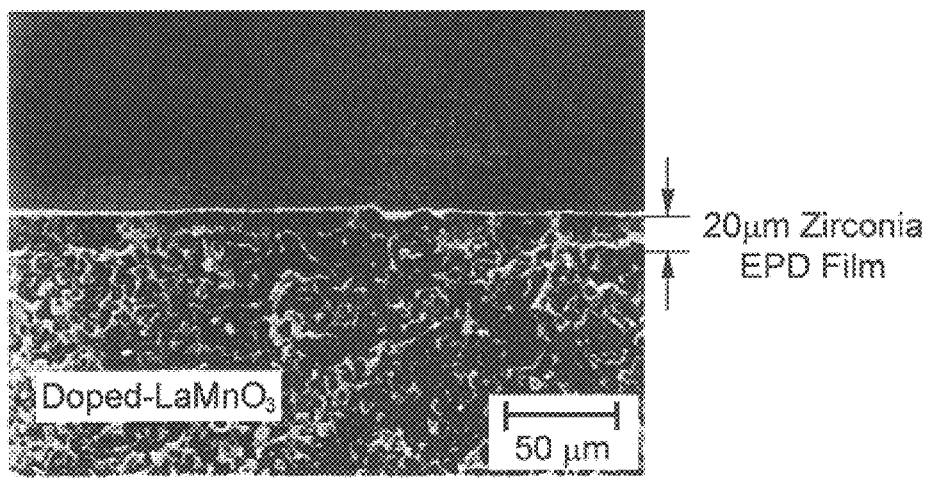
Figure 11C:
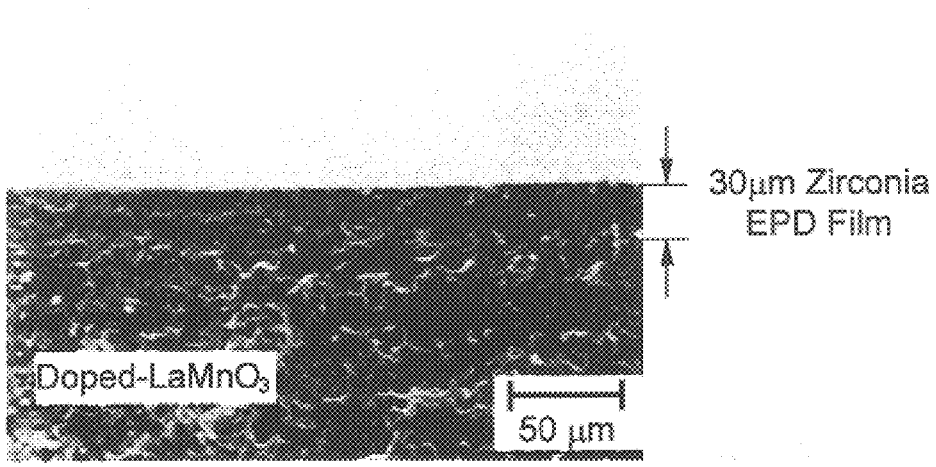
Figure 12:
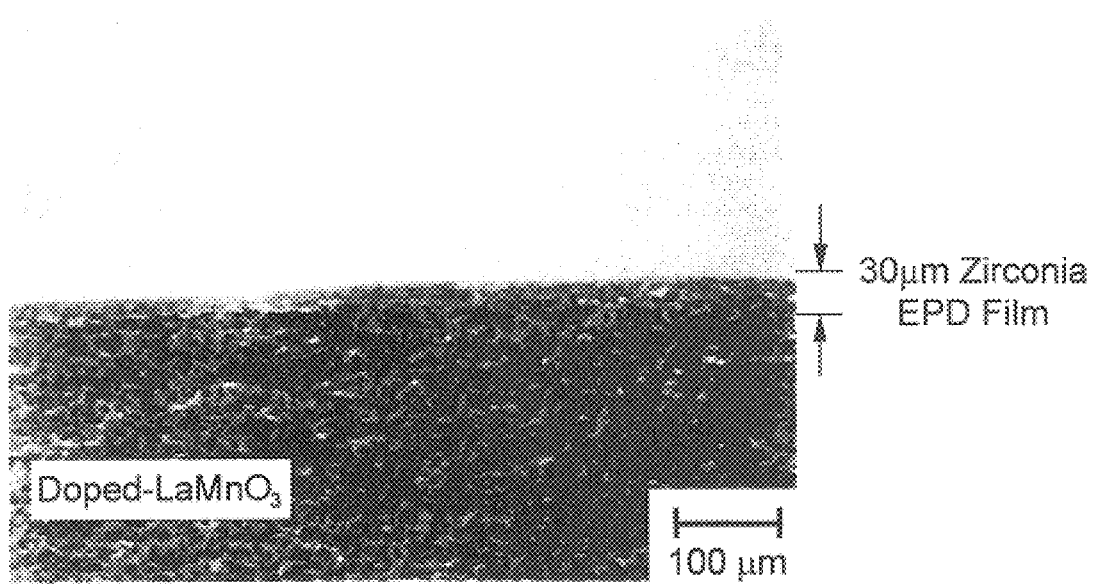
FIG. 12 is a cross-sectional view at low magnification of a doped $LaMnO_3$/zirconia film sintered at 1300° C.

In summary, we have found that samples having a fugitive graphite interlayer can achieve a zirconia EPD coating which has more uniform thickness, better surface morphology, less Mn and La diffusion from the substrate, and relatively strong adhesion at the LDM/zirconia interface (when sintered at 1300° C.), as compared to samples without interlayers. Typical microstructures showing uniform deposition of sintered zirconia films on porous doped $LaMnO_3$ substrates (fugitive graphite coated), obtained following EPD, are shown in FIGS. 11(a), 11(b) and 11(c). Deposition parameters used for FIGS. 11(a), 11(b), and 11(c) are 100V/cm, 30 seconds; 50V/cm, 60 seconds and 50V/cm, 120 seconds, respectively. It is evident from FIGS. 11(a), 11(b) and 11(c) that EPD is a robust deposition technique in which it is possible to control the film thickness even on porous substrates, provided a suitable fugitive interlayer is used. An examination of a sintered cross-section (LDM/YSZ) of the same sample as in FIG. 11(c) shows that the clean bonding and uniform density of the zirconia films achieved with the interface technique extend over a large area (FIG. 12). Furthermore, these positive results were obtained in a single deposition step, with results comparable to those achieved in the much more expensive EVD approach.

The thickness requirements for the carbon interlayer were also established. No differences in the quality of the overlying zirconia coatings were observed when the carbon interlayer was of intermediate thickness (15–40 seconds deposition time by sputtering). However, if the interlayer was very thin (≈5 seconds deposition time by sputtering), the zirconia EPD film quality became similar to that of samples sintered without interlayers. A maximum possible interlayer thickness was also noted. For interlayers produced by 60 seconds of sputtering time, the resulting sintered samples showed a large gap which persisted even at 1300° C.—i.e., the zirconia coating never fully reattached to the substrate. The zirconia films in this case were very uniform in density over their entire surface area, but they were only loosely attached to the substrate.

Carbon Burnout Behavior

Carbon burnout experiments were also conducted, in an effort to determine when the fugitive graphite interlayer sublimated on heating. For these experiments, annular 5 mm sections of cathode substrates that had been sputter-coated with carbon for 12 seconds or 72 seconds were placed in a multiphase carbon analyzer (Leco RC-412) and heated (in oxygen) at rates of 10° C./min to temperatures of 900° C. The amount of carbon present was determined from the degree of optical signal received and detected through the evolved $CO_2$ vapor. A sample of similar dimensions, but without a graphite coating, was used as a reference.

Figure 13:
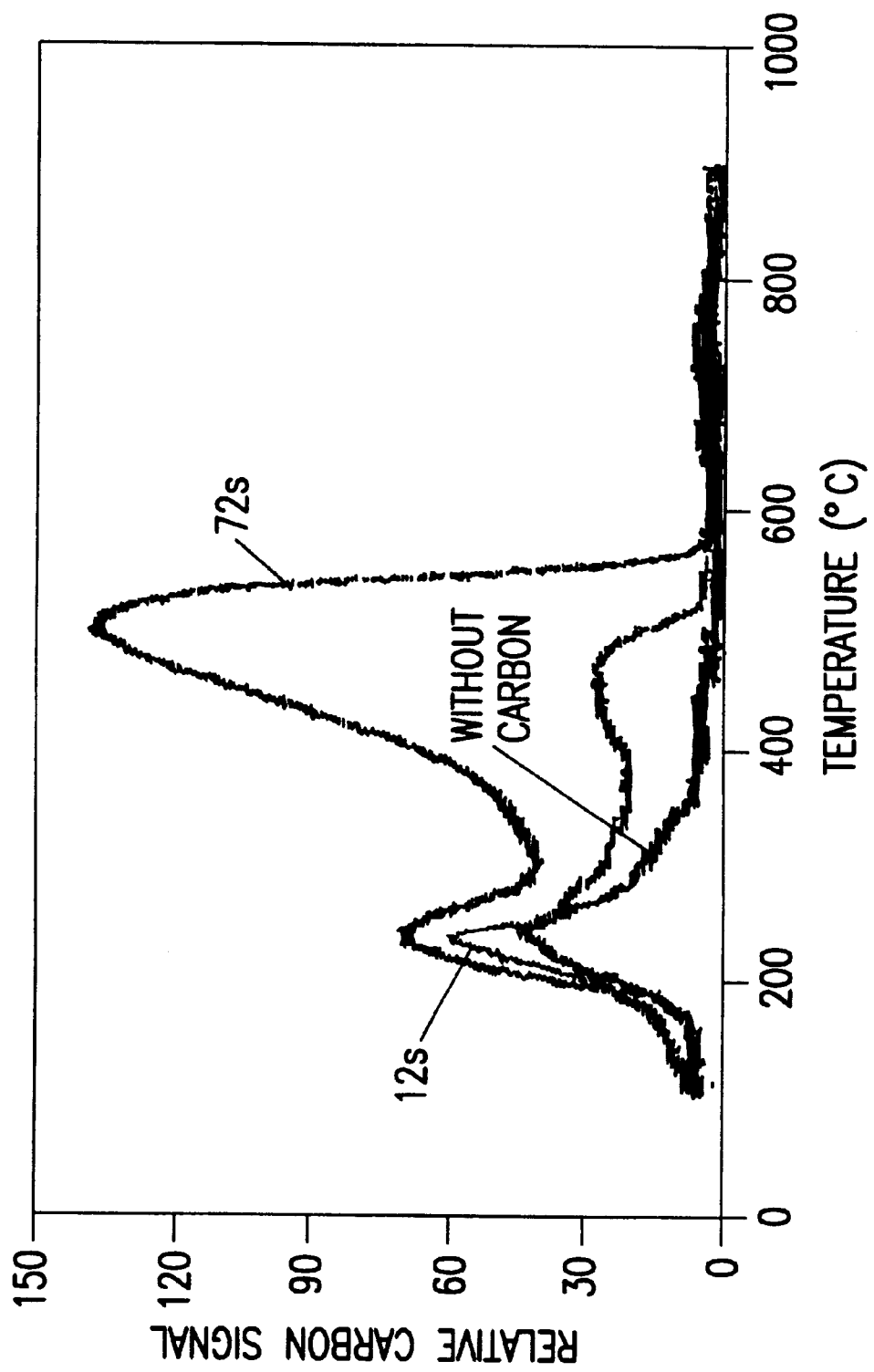
FIG. 13 is a diagram showing carbon burnout plots for specimens sputter-coated with carbon.

The results of carbon evolution experiments indicate more clearly when the graphite interlayer has fully sublimed from the substrate. FIG. 13 shows two sets of peaks. The first peak, at 225° C., occurs in all samples, including the reference sample without graphite. This peak is attributed to an (as-yet unidentified) volatile species inherently resident in the LDM substrate. The second set of peaks, at around 500° C., reflects the evolution of carbon from the graphite coating. The data in FIG. 13 confirm that carbon burnout starts at around 300° C. and is completed around 600° C. There were no detectable signals beyond 600° C.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for deposition of an electrolyte material on a porous substrate comprising the steps of:

forming a suspension comprising a polar liquid medium and a plurality of particles having a controlled surface charge and suitable for use as an electrolyte;

depositing a fugitive electrically conductive material on said porous substrate;

immersing said porous substrate in said suspension, said porous substrate comprising an electrode material;

applying a voltage across said suspension between an electrode in contact with said suspension and said porous substrate, such that at least a portion of said particles migrates toward said porous substrate and is deposited on said porous substrate, forming a particle layered substrate, and treating said particle layered substrate to cause a disappearance of substantially all of said fugitive electrically conductive material.

2. A method in accordance with claim 1, wherein said fugitive electrically conductive material homogenizes an electric field distribution around said pores.

3. A method in accordance with claim 2, wherein said fugitive electrically conductive material one of evaporates, dissociates and sublimes at a temperature less than about 1250° C.

4. A method in accordance with claim 1 further comprising sintering of said particle layered substrate.

5. A method in accordance with claim 4, wherein said sintering is carried out at a temperature in a range of about 1200° C. to 1400° C.

6. A method in accordance with claim 1, wherein said fugitive electrically conductive material is graphite.

7. A method in accordance with claim 1, wherein said fugitive electrically conductive material is carbon.

8. A method in accordance with claim 1, wherein said fugitive electrically conductive material is deposited on said substrate by a process selected from the group consisting of sputtering, chemical vapor deposition and evaporation.

9. A method in accordance with claim 1, wherein said substrate comprises a composition selected from the group consisting of $LaMnO_3$ and Ni—YSZ.

10. A method in accordance with claim 1, wherein said plurality of particles comprise a composition selected from the group consisting of $ZrO_2$—$Y_2O_3$, $BaCeO_3$—CaO, $BaCeO_3$—$Gd_2O_3$, $CeO_2$—$Sm_2O_3$, $ZrO_2$—CaO, and $ZrO_2$—MgO.

11. A method in accordance with claim 1, wherein said liquid medium is an acid.

12. A method in accordance with claim 1, wherein said liquid medium is a base.

13. A method in accordance with claim 1, wherein said liquid medium comprises acetic acid.

* * * * *